United States Patent
Frost

[11] Patent Number: 5,429,452
[45] Date of Patent: Jul. 4, 1995

[54] FLOATING BREAK WATER STRUCTURE

[75] Inventor: Terry G. Frost, Ketchum, Okla.

[73] Assignee: Waterbreak, Inc., Ketchum, Okla.

[21] Appl. No.: 111,722

[22] Filed: Aug. 24, 1993

[51] Int. Cl.6 .................................................. E02B 3/00
[52] U.S. Cl. .................................. 405/26; 405/21; 405/28; 405/211; 114/267
[58] Field of Search ................ 405/15, 16, 21, 22, 405/25–28, 211–215, 219, 60, 63–72; 114/266, 267

[56] References Cited

U.S. PATENT DOCUMENTS

| | | | |
|---|---|---|---|
| 246,047 | 8/1881 | Sylvester | 405/28 |
| 1,969,123 | 8/1934 | Doble | 405/28 |
| 3,321,923 | 5/1967 | Smith et al. | 114/267 X |
| 3,353,361 | 11/1967 | Lloyd | 405/28 |
| 3,695,042 | 10/1972 | Denison | 405/67 X |
| 3,777,689 | 12/1973 | Olsen et al. | 405/26 X |
| 3,798,913 | 3/1974 | Dubois | 405/70 X |
| 3,839,869 | 10/1974 | Green | 405/72 X |
| 3,859,797 | 1/1975 | Ayers | 405/72 |
| 3,969,901 | 7/1976 | Matsudaira et al. | |
| 4,174,185 | 11/1979 | Toki | 405/26 |
| 4,406,564 | 9/1983 | Hanson | 405/26 |
| 4,425,053 | 1/1984 | Muto et al. | 405/63 |
| 4,768,896 | 9/1988 | Moore | 405/26 |
| 4,997,310 | 3/1991 | Rasmussen | 405/26 |
| 5,192,161 | 3/1993 | Helgesson et al. | 405/26 |

FOREIGN PATENT DOCUMENTS

| | | | |
|---|---|---|---|
| 2579239 | 9/1986 | France | 405/26 |
| 70310 | 6/1981 | Japan | 405/28 |
| 57703 | 3/1986 | Japan | 405/63 |
| 289099 | 3/1965 | Netherlands | 405/28 |
| 379725 | 7/1973 | U.S.S.R. | 405/28 |
| 1559039 | 4/1990 | U.S.S.R. | 405/211 |

Primary Examiner—Dennis L. Taylor
Attorney, Agent, or Firm—Head & Johnson

[57] ABSTRACT

A floating breakwater structure that can be positioned adjacent to a boat dock or other area to be shielded from the effect of waves, the structure having a framework supported by floating members to maintain the framework above the water's surface and a plurality of adjacently positioned weighted rectangular concrete slabs pendulously supported into the water from the framework at least along one side of the structure, the concrete slabs being from about 8 to 12 feet in length, from 3 to 6 feet wide and 3 to 8 inches thick.

11 Claims, 3 Drawing Sheets

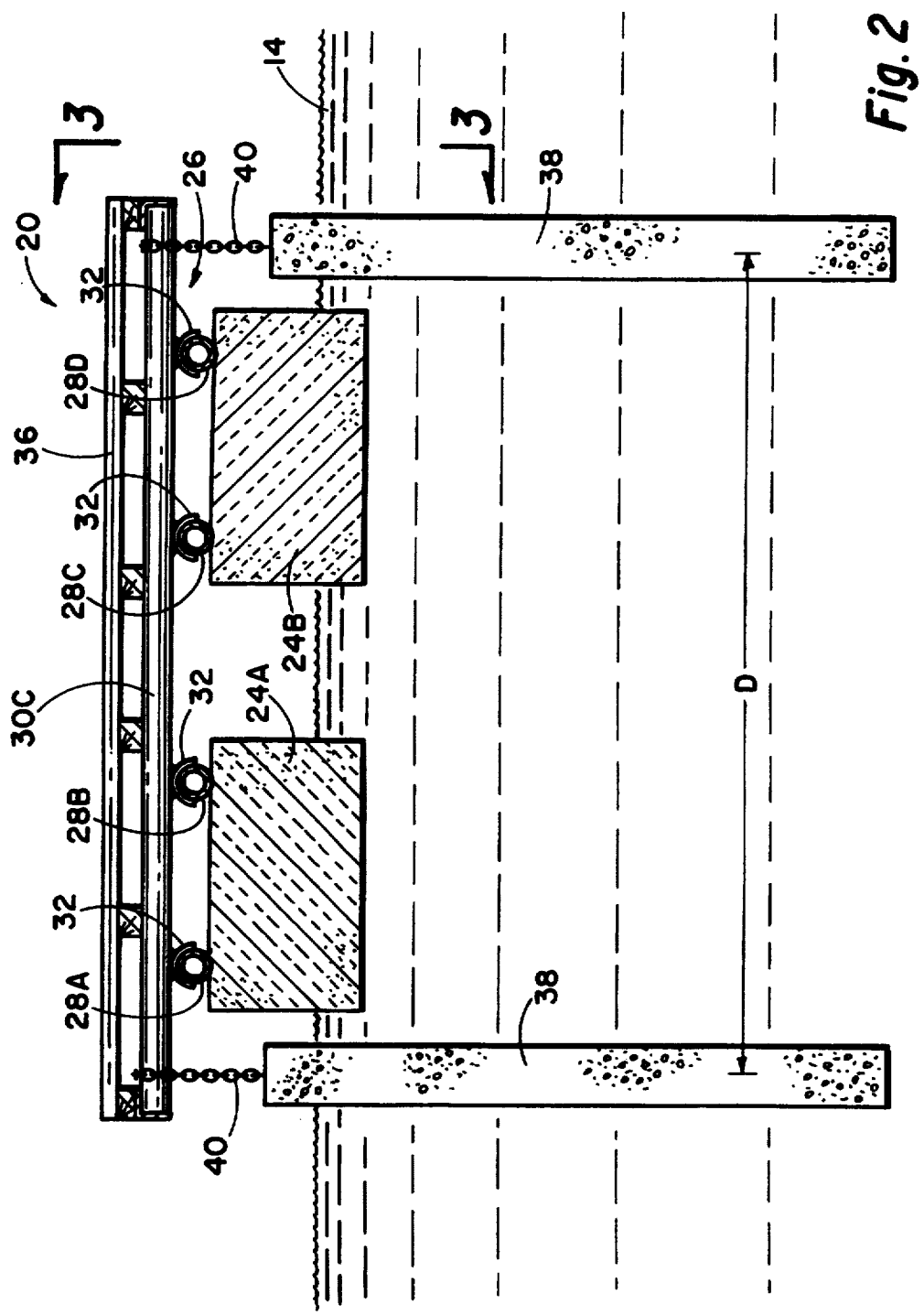

FLOATING BREAK WATER STRUCTURE

BACKGROUND OF THE INVENTION

Most lakes and harbors in the United States and other countries of the world have numerous boat and ship docking facilities. Wave action is damaging to boats and ships that are moored in such harbors and marinas. In addition, the marinas themselves are damaged by constant wave action caused either by the wind or by passing boats.

To protect harbors and marinas others have devised floating breakwaters whose function it is to intercept and reduce the action of waves. For reference to background material relating to the basic subject matter of this invention reference may be had to the following U.S. Pat. Nos.: 3,969,901 "Floating Breakwaters"; 4,174,185 "Floating-Type Anti-Oil Anti-Impact And Anti-Wave Barrier"; 4,406,564 "Breakwater"; 4,768,896 "Offset Breakwater Device"; and 5,192,161 "Floating Structure For Use As A Breakwater".

The present disclosure provides an efficient and economical system for protecting a marina or any similar structure from wave action and is particularly useful in protecting an elongated marina where a plurality of boats are moored.

SUMMARY OF THE INVENTION

This invention relates to a floating breakwater useful for protecting marinas where boats are stored or for other similar type harbor applications. The breakwater includes an elongated floating structure that is preferably in the form of paralleled spaced apart blocks of floatable material, such as styrofoam. On the surface of the spaced apart floatable blocks a horizontal structural framework is provided employing longitudinal and cross-structural members. A working surface may be erected on top of the structural framework if desired, although such working surface is not concerned with the breakwater action of the structure. Suspended from the structural framework cross-members are a plurality of adjacently positioned weighted bodies. The weighted bodies are preferably concrete slabs having a width of from three to six feet. The slabs may vary in length and thickness, although a preferred length of slab is from about eight to twelve feet and with a thickness from about three to eight inches.

The concrete slabs are supported in a plane along one longitudinal edge of the structural framework and suspended by flexible members, such as chains or cables, so that the top of each slab is above the normal water surface. While the concrete slabs may be supported along only one longitudinal side of the structural framework, the use of slabs along opposite sides of the framework is preferred for two reasons. First, the use of two rows of concrete slabs balances the structure so that it will float level in the water. Second, the use of two paralleled rows of concrete slabs helps to further smooth the action of waves impinging upon the breakwater structure.

A better understanding of the invention may be had by reference to the following description and claims, taken in conjunction with the attached drawings.

DESCRIPTION OF THE DRAWINGS

FIG. 2 is an elevational cross-sectional view taken along the line 2—2 of FIG. 1 showing more details of the construction of the floating structure. FIG. 2 shows the framework supported upon paralleled spaced apart floating bodies with elongated rows of concrete slabs supported from the framework along each longitudinal edge.

DESCRIPTION OF THE PREFERRED EMBODIMENT

Figure 4:
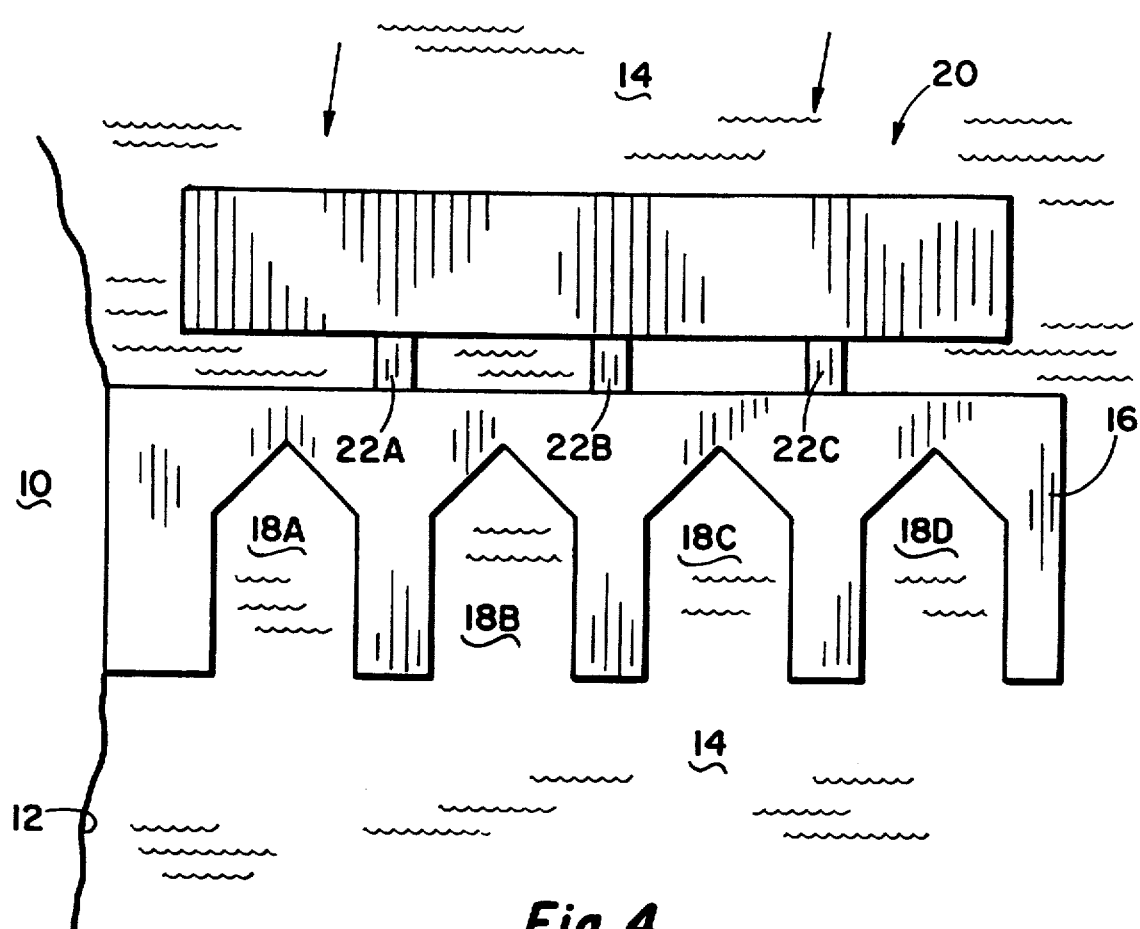
FIG. 4 is a plan view of a boat dock having slips therein for mooring boats and showing a longitudinal floating structure positioned adjacent to the boat dock to protect the boat dock against the action of waves and to protect boats that may be moored in the slips against wave action.

Refer first to FIG. 4. This illustrates a typical environment in which the breakwater of this invention may be employed. FIG. 4 is a plan view showing a land area 10 and a shoreline 12 adjacent a body of water 14. Extending from the land and onto the body of water is a boat dock 16 having boat slips 18A through 18D. Boat dock 16 is preferably built so as to shield boats that may be moored in slips 18A through 18D in an orientation so that the boats face in the direction towards wave action, however, most boat docks are not designed or equipped to effectively impede the action of waves. To protect boat slips 18A through 18D and any boats that are moored therein, an elongated floating breakwater structure, generally indicated by the numeral 20, is extended by means of arms 22A through 22C from the boat dock. This invention pertains exclusively to the elongated floating breakwater structure 20 that will now be described in detail, first by reference to FIG. 1, which shows a partial, broken away plan view of the structure and by reference to FIG. 2 which shows a cross-section of the elongated floating breakwater structure.

To float the breakwater structure on the surface of the body of water 14, parallelled spaced apart elongated flotation members 24A and 24B are employed. Flotation members 24A and 24B may be formed of hollow metal containers, hollow plastic containers, or as in the illustrated arrangement, may be formed of styrofoam, a material frequently used for the construction of floating docks and platforms.

Resting upon floatation members 24A and 24B is a structural framework, generally indicated in FIG. 2 by the numeral 26. The framework is formed by elongated structural members 28A through 28D (see FIG. 1), there being two such elongated structural members resting on the top surface of each floatation member 24A and 24B. The structural framework 26 is further formed by paralleled spaced apart cross members, there being four cross-members 30A through 30D seen in FIG. 1 with cross-member 30C being shown in FIG. 2, other cross-members are obscured. The cross-members may be mechanically secured to the elongated structural members 28 or, in the illustrated arrangement, saddles 32 may be welded to cross-members 30 to rest upon the longitudinal structural members 28A-28D as illustrated.

A decked working surface 36 may, as illustrated, be positioned upon structural framework 26, although such is not required if the framework is to function strictly as a breakwater. However, in most instances, good use can be made of a decked surface extending over the water for fishing or along which boats can be tied up temporarily. Decking can be completed using elongated wood stringers 34, such as 2×4's or 2×6's, extending over and secured to cross-members 30A-30D. Decking boards are nailed to stringers 34 to complete decked surface 36.

The structure described up to this point provides a good means of affording an elongated decked surface but does not effectively guard boat slips 18, as seen in FIG. 4, from wave action. The breakwater function of the structure is accomplished by the employment of a plurality of adjacently positioned weighted bodies pendulously supported into the water along at least one side of structural framework 26. In the illustrated and preferred arrangement, the adjacently positioned weighted bodies are pendulously supported along both sides of breakwater structure 26. In the preferred arrangement, the weighted bodies are in the form of concrete slabs 38. Concrete slabs are preferred as a method of providing the weighted bodies, although weighted bodies may be made of metal, but metal is much more expensive and most metals are subject to corrosion when in water. Well made concrete is substantially impervious to deterioration in water. Concrete slabs 38 are preferably of a width from three to six feet. The top of each of the slabs should be positioned so that it is above the normal water level. The slabs may be of a thickness of about three to eight inches and of length which can vary considerably but typically may be about eight to twelve feet. If concrete slabs 38 are longer than about twelve feet, they should include some structural reinforcing at the time the slabs are poured, although structural reinforcing may also be employed in shorter length slabs if desired.

Figure 3:
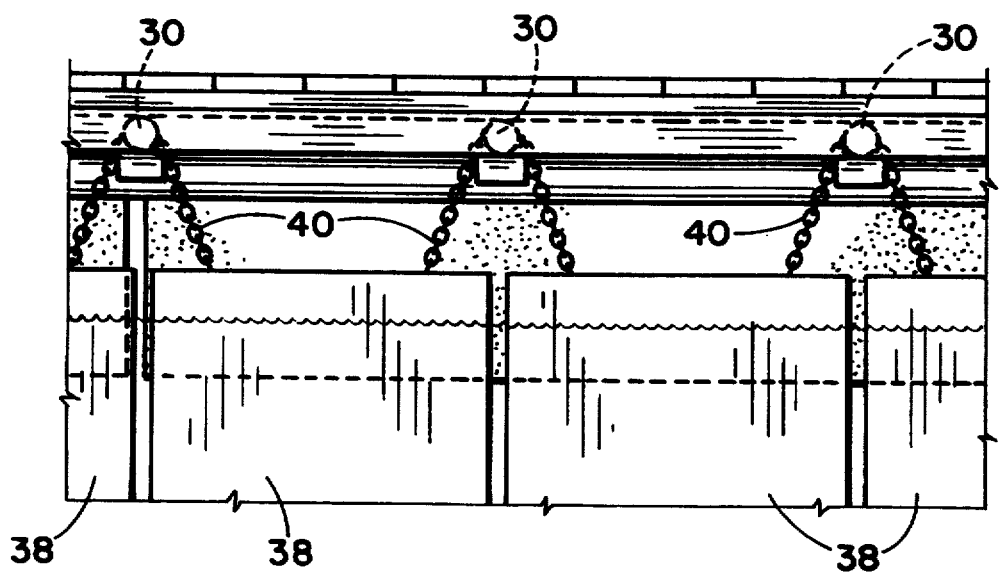
FIG. 3 is a partial elevational view as taken along the line 3—3 of FIG. 2 showing more details of the arrangement for supporting the concrete slabs to the framework.

Slabs 38 are preferably supported to structural framework 26 by means of flexible supports 40, such as chains or cables, chains being illustrated in FIGS. 2 and 3. Hook members (not illustrated) that extend above the top of the slabs may be encased in concrete slabs 38 at the time they are poured with flexible supports 40 being secured to the hook members.

The preferred arrangement of supporting the slabs is shown in FIGS. 2 and 3 in which a single length of flexible support 40, such as a single length of chain, extends from one slab over the top of a cross-member 30 to connect to the top of an adjacent slab. In this manner, the slabs are supported in correct adjacent relationship to each other.

Figure 1:
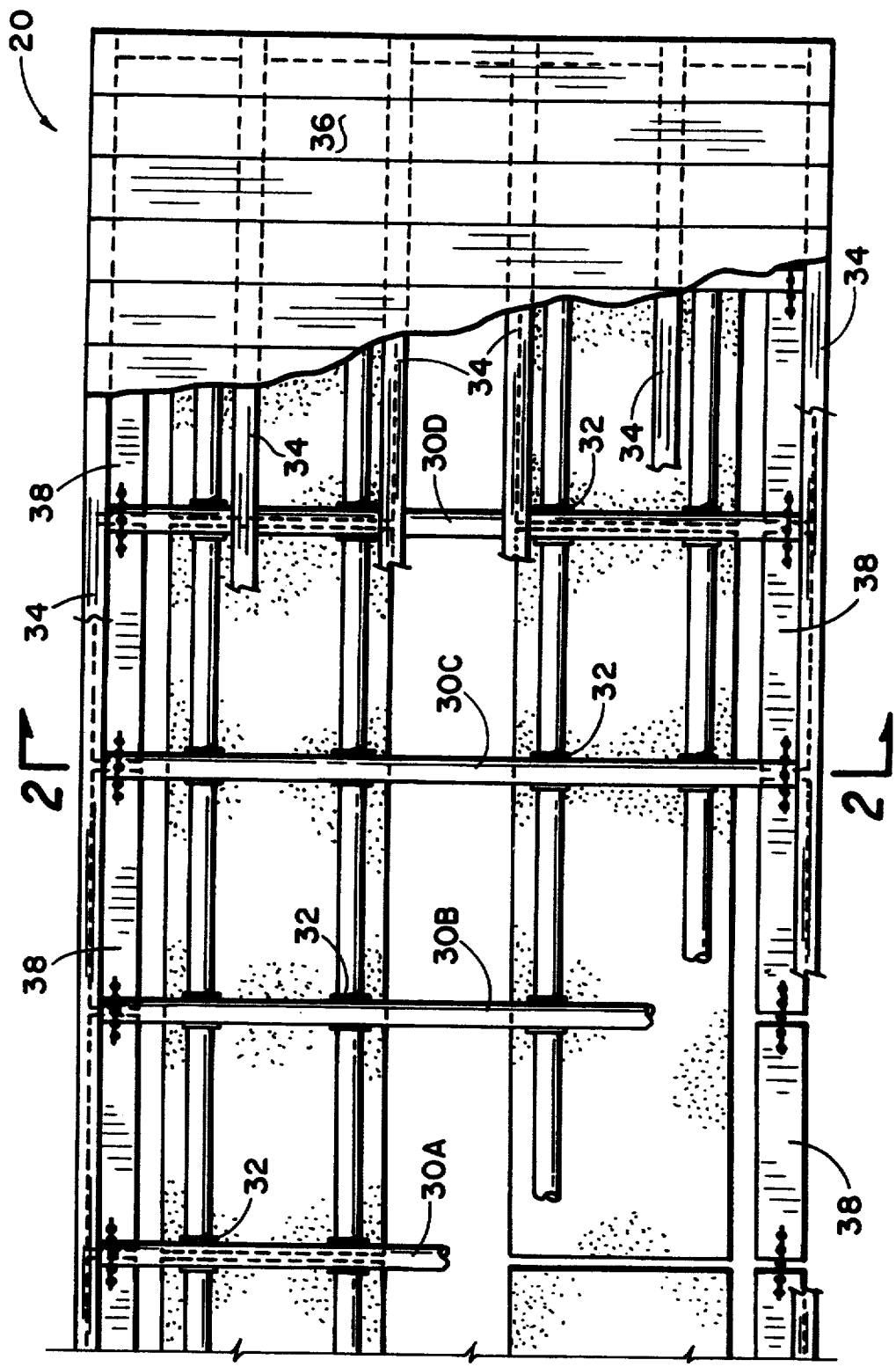
FIG. 1 is a plan view, shown partially broken away, of a longitudinal floating structure that incorporates the principles of this invention. The structure of FIG. 1 may be employed in conjunction with a boat dock having boat slips therein or with any other facility that needs protection from wave action.

For utmost efficiency in abating the action of waves where opposed rows of floating slabs are employed, such as illustrated in FIGS. 1 and 2, the spacing "D" between the opposed rows of slabs may become important. For optimum breakwater effect, the spacing "D" between the opposed paralleled rows of slabs 38 should be approximately ½ of the wavelength of the typical or average wave that will impinge on the breakwater structure. By spacing the rows of slabs ½ wavelength apart, the attenuating effect of the breakwater structure is improved in the same way that ½ wavelength dimensions are employed for damping sound energy.

The elongated floating breakwater structure thus described is inexpensive to manufacture, using primarily styrofoam, structural members such as pipe, and concrete rectangular slabs, thus eliminating the use of any exotic or expensive materials. The structure, when completed with decking 36, provides a useful appendage to a boat dock 16 and, at the same time, functions to substantially reduce the damage to dock structure 16 and boats moored in slips 18.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A wave action breakwater comprising:
   a longitudinal floating structure upon a water surface;
   a structural framework supported upon said floating structure; and
   a plurality of independent adjacently positioned weighted slabs pendulously supported from said framework and vertically extending above and below said water surface substantially along the longitudinal length of said floating structure whereby wave action striking one side of said slab is substantially dissipated on the other side of said slab.

2. A breakwater according to claim 1 wherein said framework includes a plurality of spaced apart parallel members transversely located along said framework to which said weighted slabs are supported.

3. A breakwater according to claim 1 wherein each of said weighted slabs comprises a slab of concrete of length from 8 to 12 feet, of width from 3 to 6 feet and of thickness from 3 to 8 inches.

4. A breakwater according to claim 1 wherein said floating structure comprises two paralleled blocks of floatable material.

5. A breakwater according to claim 4 wherein said floatable material is styrofoam.

6. A breakwater according to claim 1 wherein said structural framework includes decking.

7. A breakwater according to claim 3 wherein each concrete slab is about 5 feet wide, 12 feet long and 4 inches wide.

8. A breakwater according to claim 1 wherein there are weighted slabs on each side of said framework being spaced by a distance of approximately one-half the wavelength of expected wave action.

9. A wave action breakwater comprising:
   a floating structure upon a water surface;
   a structural framework supported upon said floating structure; and
   at least one weighted slab pendulously supported from said framework and vertically extending above and below said water surface substantially along one side of the said floating structure, whereby wave action striking one side of said slab is substantially dissipated on the other side of

10. A breakwater according to claim 9 wherein said framework includes a plurality of spaced apart members located transversely along said framework to which said weighted slab is pendulously supported.

11. A breakwater according to claim 9 wherein said weighted slab comprises a slab of concrete.

* * * * *